M. H. STEWART.
TIRE CARRIER.
APPLICATION FILED NOV. 4, 1916.
1,225,370.
Patented May 8, 1917.
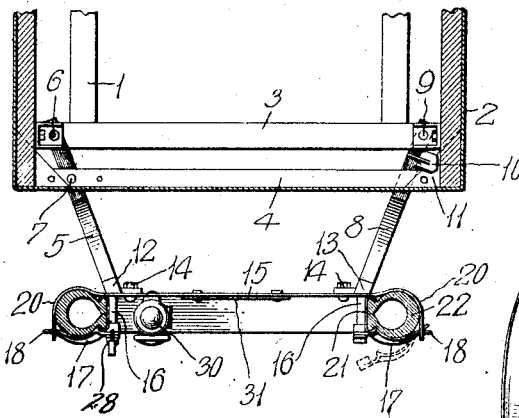
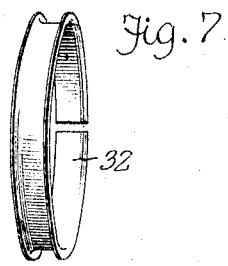
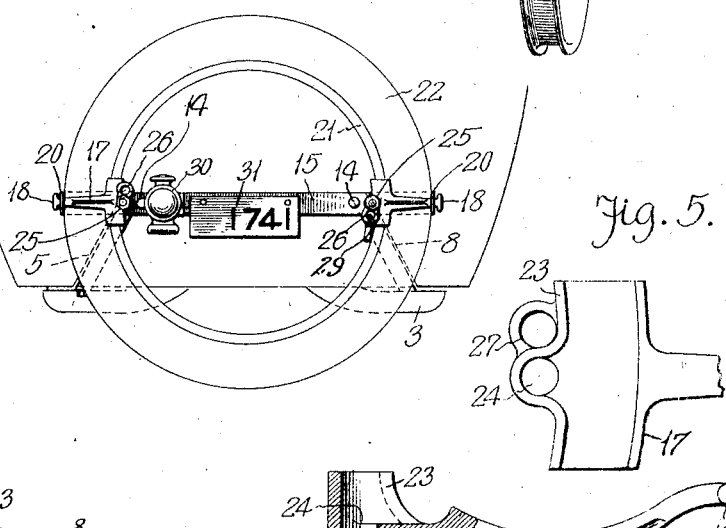
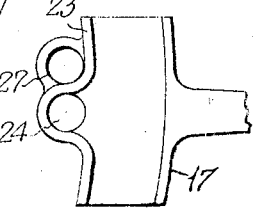
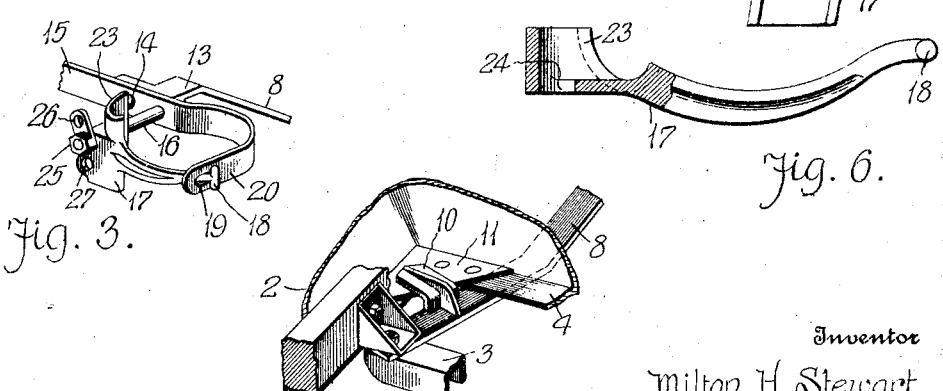
Inventor
Milton H. Stewart,
Witnesses
Chas. W. Stauffiger
Karl H. Butler.
By
Attorneys

UNITED STATES PATENT OFFICE.

MILTON H. STEWART, OF DETROIT, MICHIGAN, ASSIGNOR TO THOMAS J. WALSH, OF DETROIT, MICHIGAN.

TIRE-CARRIER.

1,225,370.     Specification of Letters Patent.     Patented May 8, 1917.

Application filed November 4, 1916. Serial No. 129,407.

*To all whom it may concern:*

Be it known that I, MILTON H. STEWART, a citizen of the United States of America, residing at Detroit, in the county of Wayne and State of Michigan, have invented certain new and useful Improvements in Tire-Carriers, of which the following is a specification, reference being had therein to the accompanying drawings.

This invention relates to a tire carrier for automobiles and to an arrangement thereof whereby it is readily secured to a car of well known construction by utilization of holding members and openings on the car, thus obviating alterations, and drilling or changing the car body in any manner. The invention also includes means for securely locking an applied tire in such way as to prevent surreptitious removal.

The invention consists in the matters hereinafter set forth, and more particularly pointed out in the appended claims.

In the drawings,

Figure 1 is a plan view of the device showing an applied tire rim in section and the portions of a chassis and car body for which the device is peculiarly fitted;

Fig. 2 is a view in end elevation of the holder;

Fig. 3 is a view in detail showing the method of attachment of a clamp;

Fig. 4 is a view in detail showing the attachment of a brace of the device to the car frame;

Figs. 5 and 6 are views in detail of a clamp, and

Fig. 7 is a view showing a dummy rim for use with a clencher tire.

Referring to the drawings, the car body and chassis consists of side members 1 on which a body 2 is so mounted that the end rail 3 of the chassis is parallel to and spaced from the end sill 4 of the body. A bracket bar 5 of the carrier is secured at its extremity by the body bolt 6, and by a second bolt 7 passing through an opening in the sill 4 and ordinarily used for attaching a tail light. A corresponding bracket bar 8 is secured at its inner end by the carriage bolt 9 and has a lug 10 extending obliquely upward and outward so as to hook over the angle plate 11 that connects the side and end sills of the body, the underface of the lug being inclined as stated, so that when the correspondingly formed outer end portions 12 and 13 of the bars 5 and 8 are secured as by bolts 14 to a cross bar 15, the member 8 is firmly wedged home and cannot rattle or work loose.

Studs 16 that extend outwardly from the end portions 12 and 13 through the bar 15, support clamps 17, each having a T-shaped head 18 that is insertible through a longitudinal slot 19 in the curved end portion 20 of the bar 15, the disposition of the slot and head being such that the clamp is locked with the strip when placed on the stud 16. The body of the clamp adjacent the stud is extended laterally and curved and flanged to coöperate with the stud 16 and curved portion 20 in closely embracing an applied tire rim 21 and casing 22. A marginal flange 23 on the clamp is curved, however, to pass around the bolt opening 24 through which the stud 16 passes so that as indicated in the dotted portion of Fig. 1, the clamp may be swung outward off from the stud readily.

A holding nut 25 on the stud 16 has an apertured lug 26 that may be swung into register with a correspondingly apertured lug 27 on the clamp 17 and the hasp of a padlock, as indicated at 28, in Fig. 1, or 29 in Fig. 2, inserted and the parts locked. The cross bar 15 is appropriately apertured or fitted to carry a tail-light 30 and license plate 31.

Where the carrier is used for a tire without a spare rim, a dummy rim 32, see Fig. 7, is employed to replace the spare rim 21, the cross section of the dummy rim being appropriate for the type of tire carried.

As a result of this construction a tire carrier is obtained that is particularly adapted for mounting on a standard make of car which has the chassis construction and body members indicated, that is neat in design, does not add materially to the weight of the car and effectively locks the tire and spare rim in place.

Obviously, changes in the details of construction may be made without departing from the spirit of my invention and I do not care to limit myself to any particular form or arrangement of parts.

What I claim is:—

1. A tire carrier comprising a pair of brackets adapted to be detachably interlocked with and secured to the frame members of a vehicle chassis, a transverse bar having outwardly curved end portions outside the bracket ends to which the transverse member is secured, a stud extending from each bracket, a clamp apertured at one end to engage over the stud and interlocked at the other end in an opening through the curved end portion of the transverse bar, nuts on the studs for securing the clamps and lugs on the nuts adapted to register with corresponding lugs on the clamp and apertured to receive a lock.

2. A tire carrier comprising a pair of brackets adapted to be detachably secured at the inner end portions thereof to the frame members of a chassis, a transverse bar secured across the outer end portions of the brackets, the end portions thereof extending beyond the brackets and curving rearwardly to conform to an applied tire casing, clamps each having a T head detachably engaging a slot in the companion end portion of the transverse bar and encircling a stud that extends from each bracket the portions of the clamps adjacent the studs being formed to clear the latter when the clamp is swung away therefrom while still engaged with the end portion of the transverse bar, and nuts for securing the clamps adapted to be locked to the clamps to prevent removal from the studs.

In testimony whereof I affix my signature in the presence of two witnesses.

MILTON H. STEWART.

Witnesses:
 KARL H. BUTLER,
 ANNA M. DORR.